Figure 1:

United States Patent [19]

Lagro

[11] Patent Number: 5,732,661
[45] Date of Patent: Mar. 31, 1998

[54] ANIMAL CONTROL LEASH WITH GRAPPLER

[76] Inventor: Karen A. Lagro, R.R. #1, Box 613, Bethel, Vt. 05032

[21] Appl. No.: 876,367

[22] Filed: Jun. 16, 1997

[51] Int. Cl.$^6$ ............................................. A01K 27/00
[52] U.S. Cl. ...................................... 119/795; 119/770
[58] Field of Search ............................... 119/792, 793, 119/795, 796, 769, 770, 797

[56] References Cited

U.S. PATENT DOCUMENTS

| | | | |
|---|---|---|---|
| 2,937,023 | 5/1960 | Seymour et al. | 119/769 |
| 5,363,870 | 11/1994 | Kraus | 119/795 |
| 5,456,213 | 10/1995 | Beauchamp . | |
| 5,485,811 | 1/1996 | Jacobsen et al. | 119/292 |
| 5,551,380 | 9/1996 | Hodgson | 119/795 |
| 5,617,949 | 4/1997 | Harris et al. | 119/795 |

*Primary Examiner*—Paul J. Hirsch
*Attorney, Agent, or Firm*—John J. Welch, Jr., Esq.

[57] ABSTRACT

The present device, an animal control leash with grappler consists of elongated strapping affixed to a first end of which there is a clasping device with a second end thereof being a closed loop and with a grappling component affixed to the strapping in the vicinity of the first end such that an upper side of the grappling component is smooth and a lower side of the grappling component is characterized by the presence of a plurality of ridges and grooves.

1 Claim, 2 Drawing Sheets

ANIMAL CONTROL LEASH WITH GRAPPLER

CROSS REFERENCES TO PRIOR APPLICATIONS

There are no prior applications in respect of the instant invention.

FEDERALLY SPONSORED RESEARCH AND DEVELOPMENT

There is no federally sponsored research and development in respect of the instant invention.

BACKGROUND OF THE INVENTION

1. Field of the Invention

The instant invention relates to those sorts of devices resorted to for the purpose of restraining and tethering animals and, in particular dogs.

2. Prior Art Statement

The following references resemble, but, respectfully submitted, do not anticipate the instant invention:

| Inventor | Invention | Patent #: | Date |
| --- | --- | --- | --- |
| Kraus | Two Handled Animal Control Tether | 5,363,810 | 11/15/94 |
| Kulik | Animal Leash | 4,763,609 | 08/16/88 |
| Fuentes | Lead and Tethering Device | 5,351,654 | 10/04/94 |
| Brown | Hands-Free Dog Jogger Apparatus | 5,161,486 | 11/10/92 |
| C. Mintz | Control Leash | 3,332,398 | 07/25/67 |

A SUMMARY OF THE INVENTION

1. A Brief Description of the Invention

The instant invention consists of a hook holder component affixed to one end of an elongated piece of strapping. The hook holder component is a clasping device amenable to being attached to or detached from, for example, a collar device about the neck of an animal such as a dog. The second end of the elongated piece of strapping is in the form of a looped end such as is amenable to be readily held by one of a person's two hands. Affixed to the elongated piece of strapping in the vicinity of the first end of such strapping is a grappling component. The grappling component circumscribes the strapping and is smooth and raised on an upper side while being characterized by the presence of a plurality of ridges and grooves on a lower side amenable to receipt of the fingers of one of a person's hands on a lower side.

2. Objects of the Invention

It is often the case that it becomes necessary for a person out walking an animal such as a dog to be able to quickly and effectively restrain it. However, with respect to animal leashes characterized by prior art, such quick and effective restraint is not necessarily always possible and sometimes with dire consequences. A person walking a dog especially a big dog that decides to quickly approach another person or animal in its vicinity may well be unable to quickly restrain the dog by, for example resorting to the conventional method for doing so, namely, effectively grabbing hold of the leash holding the dog with a free hand closed to the end of the leash clasped to the dog's collar. Efforts to do so, as in cases involving resort to exemplar embodiments of prior art result in slippage especially if the free hand is sweaty or the leash is wet or in lost valuable time in those instances involving leashing with looping near the clasping end of the leash as the person holding leash struggles to work a free hand into and about the looping. The instant invention serves to clearly obviate the prospects of any such lost valuable time. The holder of the instant invention on an animal in need of quick and effective restraint has only to quickly grasp the grappling component of the instant invention which is readily amenable to being received by the fingers of a free hand on a lower side made up of ridges and grooves and by the palmar surface of a free hand on and about a smooth upper side in order to thereby obviate such prospects of any such lost valuable time and the dire consequences that can sometimes otherwise be attendant thereto. It is for the reason that the instant invention provides a means for invariably dependable quick and effective restraint of suddenly overtly frisky and/or aggressive animals such as dogs being held that it is, respectfully submitted, a virtually revolutionary new, useful and unique device.

A DESCRIPTION OF THE DRAWINGS

1. FIG. 1 shows a person walking a dog utilizing the instant invention.

Figure 2:
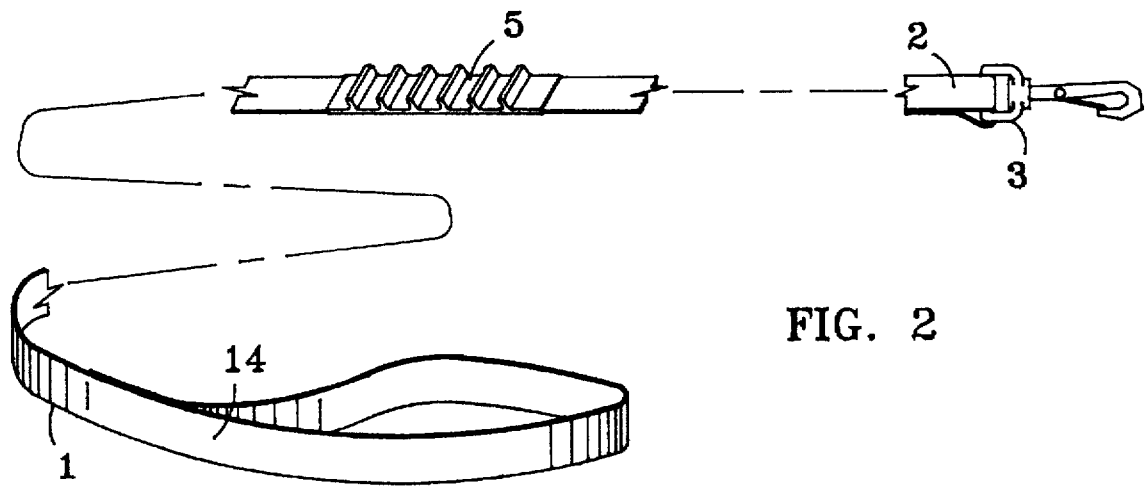

2. FIG. 2 is a broken perspective view of the instant invention.

Figure 3:
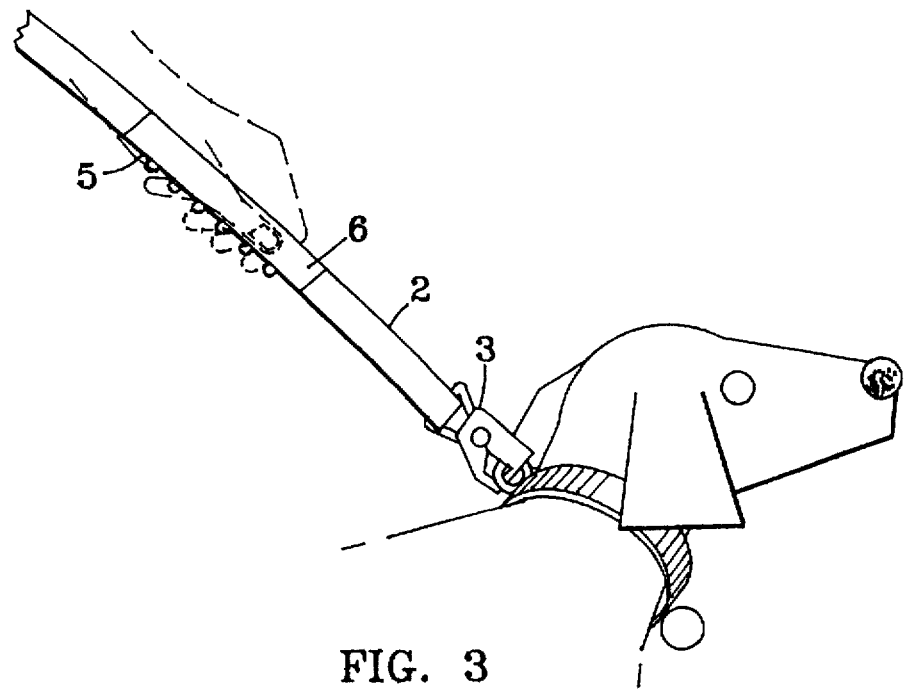

3. FIG. 3 is a close up view of the stitched on finger and hand grappling component of the instant invention with reference to a hand holding same in the vicinity of a dog sought to be held fast by way of gripping this component of the instant invention.

Figure 4:
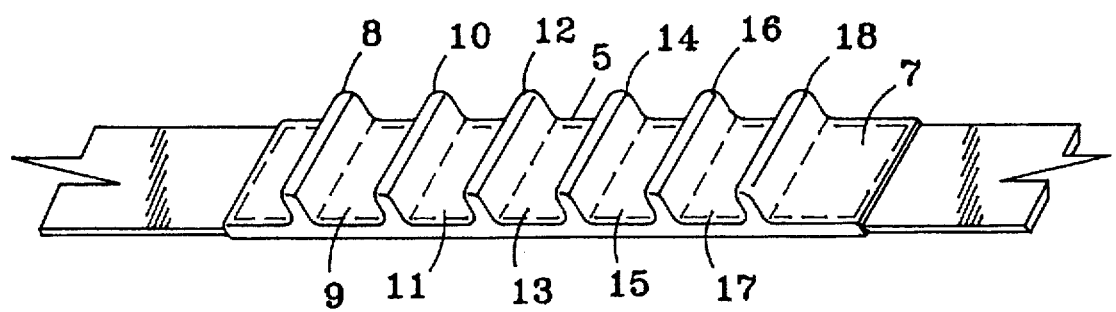

4. FIG. 4 is an isolated close up view of the stitched on finger and hand grappling component of the instant invention.

A DESCRIPTION OF THE PREFERRED EMBODIMENTS

FIG. 1 shows a person walking a dog utilizing the instant invention. FIG. 2 is a broken perspective view of the intact instant invention. In FIG. 2 there is seen the body of the instant invention which is characteristically a piece of elongated strapping 1. Strapping 1 can be a tightly woven material or it could be made of leather or for that matter perhaps a hardy rubberlike material. At a first end 2 of strapping 1 there is there affixed a clasping component 3 which hooks about a ring or loop attached to a collar about the neck of an animal such as a dog. The ring or loop could also be affixed to a brace or bodycovering material circumscribing the girth of an animal's body as well. A second end 4 of strapping 1 is a closed looped end. A person seeking to tether an animal such as a dog out for a walk typically would hold looped end 4 with one hand. Affixed to and circumscribing strapping 1 in the vicinity of first end 2 is the grappling component 5 of the instant invention. Grappling component 5 has a smooth upper side 6 and a lower side 7 characterized by the presence of a plurality of ridges and grooves, namely ridge 8, groove 9, ridge 10, groove 11, ridge 12, groove 13, ridge 14, groove 15, ridge 16, groove 17 and ridge 18 all as can be seen with reference to FIGS. 3 and 4. Grappling component 5 can be comprised of any type of sturdy, hardy material such as a firm rubberlike material or roughhew tacky material amenable to being crimped by appropriate stitching means into relatively inflexible ridges separated by grooves in between such ridges. The ridges all with height extending from a base surface of lower side 7 and grooves between the ridges of grappling component 5 are amenable to readily receiving the fingers of a person's free hand when such a person walking a tethered animal holding looped end 4 of the instant invention is required to quickly and effectively restrain the animal by way of grasping grappling component 5 with his or her free hand where the smooth upper side of grappling component 5 is likewise readily amenable to being concomitantly held by the thumb and palmar surface of that person's free hand. As was earlier pointed out, it is grappling component 5 affixed to strapping 1 in the vicinity of end 2 that operates to ensure abrogation of otherwise lost valuable time within the framework of a setting wherein a tethered animal unpredictably or suddenly opts to become overly frisky or aggressive in the relatively near presence of another person or animal. Grappling component 5 makes it possible to quickly and effectively reign in such a suddenly frisky or aggressive tethered animal without the fear of slippage or fumbling to otherwise seek to hold the animal with the previously free hand as well.

In conclusion, it is, once again, respectfully submitted that the instant invention for the foregoing reasons is indeed new, useful and unquestionably unique.

What is claimed is:

1. An animal control leash with grappler, comprising:
   a. elongated strapping material;
   b. a clasping component affixed to a first end of said elongated strapping material;
   c. a second end of said elongated strapping material being in the form of a closed loop;
   d. a grappling component affixed to and circumscribing said elongated strapping material near said first end;
   e. said grappling component having a smooth upper side and a lower side characterized by the presence of a plurality of ridges and a plurality of grooves;
   f. each one of said plurality of ridges being inflexible and said each one having height extending from a base surface of said lower side;
   g. said grappling component being made of a material amenable to being stitched to said elongated strapping so as to thereby form said each one of said plurality of inflexible ridges with each groove of said plurality of grooves being between two of said each one of said plurality of ridges, and;
   h. stitching means for affixing said grappling component to said elongated strapping and for forming said each one of said plurality of ridges.

* * * * *